(12) United States Patent
Shang

(10) Patent No.: US 11,345,025 B2
(45) Date of Patent: May 31, 2022

(54) ROBOT CONTROLLING METHOD, SYSTEM AND WAREHOUSE-TRANSPORT ROBOT

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventor: Chunpeng Shang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 336 days.

(21) Appl. No.: 16/341,756

(22) PCT Filed: Oct. 12, 2017

(86) PCT No.: PCT/CN2017/105797
§ 371 (c)(1),
(2) Date: Apr. 12, 2019

(87) PCT Pub. No.: WO2018/068741
PCT Pub. Date: Apr. 19, 2018

(65) Prior Publication Data
US 2020/0047335 A1    Feb. 13, 2020

(30) Foreign Application Priority Data

Oct. 13, 2016  (CN) .......................... 201610893904.0

(51) Int. Cl.
*B25J 9/16*  (2006.01)
*B65G 1/04*  (2006.01)
*B25J 5/00*  (2006.01)

(52) U.S. Cl.
CPC .............. *B25J 9/1602* (2013.01); *B25J 5/007* (2013.01); *B25J 9/1664* (2013.01); *B25J 9/1679* (2013.01); *B65G 1/0492* (2013.01)

(58) Field of Classification Search
CPC ........ B25J 9/1602; B25J 5/007; B25J 9/1664; B25J 9/1679; B65G 1/0492
See application file for complete search history.

(56) References Cited

U.S. PATENT DOCUMENTS 4,495,571 A * 1/1985 Staplin, Jr. ............ G06F 13/362
710/113
5,355,062 A  10/1994 Takizawa et al.
(Continued)

FOREIGN PATENT DOCUMENTS

CN    1278074 A   12/2000
CN    1857877 A   11/2006
(Continued)

OTHER PUBLICATIONS

International Search Report dated Jan. 12, 2018 in PCT/CN2017/105797 filed Oct. 12, 2017.
(Continued)

*Primary Examiner* — Nicholas Kiswanto
*Assistant Examiner* — Jamal A Shah
(74) *Attorney, Agent, or Firm* — Oblon, McClelland, Maier & Neustadt, L.L.P.

(57) ABSTRACT

A robot controlling method, system and warehouse-transport robot, which relates to the field of robot control. The method comprises: receiving, by a chassis controller, an information synchronization instruction sent by a main controller; performing, by the chassis controller, information synchronization with a rotation controller according to the information synchronization instruction; sending, by the chassis controller, a synchronous rotation instruction to the rotation con-
(Continued)

troller, and controlling a chassis motor to drive a robot chassis to rotate at a predetermined angular velocity relative to the ground; controlling, by the rotation controller, a rotation motor to drive a robot rotation mechanism to synchronously rotate at an angular velocity relative to the rotating the robot chassis according to the synchronous rotation instruction.

17 Claims, 5 Drawing Sheets

(56) References Cited

U.S. PATENT DOCUMENTS

| | | |
|---|---|---|
| 5,565,748 A | 10/1996 | Takizawa et al. |
| 5,596,256 A | 1/1997 | Takizawa et al. |
| 5,631,531 A | 5/1997 | Takizawa et al. |
| 5,715,429 A | 2/1998 | Takizawa et al. |
| 5,812,432 A | 9/1998 | Takizawa et al. |
| 5,859,515 A | 1/1999 | Takizawa et al. |
| 2006/0287769 A1 | 12/2006 | Yanagita et al. |
| 2011/0113593 A1 | 5/2011 | Bebbington |
| 2012/0197439 A1* | 8/2012 | Wang .......... G05D 1/0038 700/259 |

FOREIGN PATENT DOCUMENTS

| | | |
|---|---|---|
| CN | 101296838 A | 10/2008 |
| CN | 102520724 A | 6/2012 |
| CN | 102923204 A | 2/2013 |
| CN | 103465259 A | 12/2013 |
| CN | 204845427 U | 12/2015 |
| CN | 204897298 U | 12/2015 |
| CN | 105364916 A | 3/2016 |
| CN | 205058045 U | 3/2016 |
| CN | 106002951 A | 10/2016 |
| CN | 106313050 A | 1/2017 |
| KR | 10-0362611 B1 | 11/2002 |

OTHER PUBLICATIONS

Combined Chinese Office Action and Search Report dated Jun. 7, 2018 in Patent Application No. 201610893904.0, 5 Pages.

* cited by examiner

ROBOT CONTROLLING METHOD, SYSTEM AND WAREHOUSE-TRANSPORT ROBOT

CROSS-REFERENCE TO RELATED APPLICATIONS

The present disclosure is based on and claims priority of Chinese Patent Application No. 201610893904.0 filed on Oct. 13, 2016, the disclosure of which is incorporated hereby as a whole into the present disclosure.

FIELD OF THE INVENTION

The present disclosure relates to the field of robot control, and in particular to a robot controlling method, system and warehouse-transport robot.

BACKGROUND

At present, some companies have invested a large number of robots in picking operations in warehouses, which has improved the operation efficiency of the warehouses. These robots are one kind of AGVs (Automated Guided Vehicle), which can be called warehouse-transport robots. In recent years, many domestic companies and scientific research institutions have dived into corresponding researches of robots.

DISCLOSURE OF THE INVENTION

According to an aspect of the present disclosure, a robot controlling method is provided, comprising: receiving, by a chassis controller, an information synchronization instruction sent by a main controller; performing, by the chassis controller, information synchronization with a rotation controller according to the information synchronization instruction; sending, by the chassis controller, a synchronous rotation instruction to the rotation controller, and controlling a chassis motor to drive a robot chassis to rotate at a predetermined angular velocity relative to the ground; and controlling, by the rotation controller, a rotation motor to drive a robot rotation mechanism to synchronously rotate at an angular velocity relative to the rotating robot chassis according to the synchronous rotation instruction, wherein, the direction of the angular velocity relative to the ground of the robot chassis is opposite to that of the angular velocity relative to the rotating chassis of the robot rotation mechanism and the value of the angular velocity relative to the ground of the robot chassis is equal to that of the angular velocity relative to the rotating chassis of the robot rotation mechanism.

Optionally, controlling, by the rotation controller, the rotation motor to synchronously rotate with the chassis motor by forming an interrupt according to the synchronous rotation instruction.

Optionally, the interrupt is formed, by the rotation controller, by responding to a level signal transition of an IO signal being the synchronous rotation instruction.

Optionally, sending, by the chassis controller, the information synchronization instruction to the rotation controller by a CAN bus in the case that the robot meets the rotation conditions; and performing, by the rotation controller, data initialization according to the information synchronization instruction.

Optionally, the method further comprises: determining, by the chassis controller, the angular velocity relative to the ground for the rotation of the robot chassis at predetermined period; and based on the synchronous rotation instruction sent by the chassis controller, determining, by the rotation controller, the angular velocity relative to the rotating chassis of the robot rotation mechanism during the interrupt.

According to a further aspect of the present disclosure, a robot controlling system is further provided, comprising: one or more memories, a main controller, a chassis controller, and a rotation controller, wherein, the main controller, the chassis controller, and the rotation controller are configured to perform a method on a basis of instructions stored in the memories, comprising: receiving, by a chassis controller, an information synchronization instruction sent by a main controller; performing, by the chassis controller, information synchronization with a rotation controller according to the information synchronization instruction; sending, by the chassis controller, a synchronous rotation instruction to the rotation controller, and controlling a chassis motor to drive a robot chassis to rotate at a predetermined angular velocity relative to the ground; and controlling, by the rotation controller, a rotation motor to drive a robot rotation mechanism to synchronously rotate at an angular velocity relative to the rotating robot chassis according to the synchronous rotation instruction, wherein, the direction of the angular velocity relative to the ground of the robot chassis is opposite to that of the angular velocity relative to the rotating chassis of the robot rotation mechanism and the value of the angular velocity relative to the ground of the robot chassis is equal to that of the angular velocity relative to the rotating chassis of the robot rotation mechanism.

Optionally, controlling, by the rotation controller, the rotation motor to synchronously rotate with the chassis motor by forming an interrupt according to the synchronous rotation instruction.

Optionally, the interrupt is formed by responding to a level signal transition of an IO signal being the synchronous rotation instruction.

Optionally, sending, by the chassis controller, the information synchronization instruction to the rotation controller by a CAN bus in the case that the robot meets the rotation conditions; and performing, by the rotation controller, data initialization according to the information synchronization instruction.

Optionally, the method further comprises: determining, by the chassis controller, the angular velocity relative to the ground for the rotation of the robot chassis at predetermined period; and based on the synchronous rotation instruction sent by the chassis controller, determining, by the rotation controller, the angular velocity relative to the rotating chassis of the robot rotation mechanism during the interrupt.

According to still another aspect of the present disclosure, a warehouse-transport robot is further provided, comprising the robot controlling system described above.

According to a further aspect of the present invention, there is also provided a computer readable storage medium on which computer program instructions are stored, which when executed by a processor implement the method, comprising: receiving, by a chassis controller, an information synchronization instruction sent by a main controller; performing, by the chassis controller, information synchronization with a rotation controller according to the information synchronization instruction; sending, by the chassis controller, a synchronous rotation instruction to the rotation controller, and controlling a chassis motor to drive a robot chassis to rotate at a predetermined angular velocity relative to the ground; and controlling, by the rotation controller, a rotation motor to drive a robot rotation mechanism to synchronously rotate at an angular velocity relative to the rotating robot chassis according to the synchronous rotation instruction, wherein, the direction of the angular velocity relative to the ground of the robot chassis is opposite to that of the angular velocity relative to the rotating chassis of the robot rotation mechanism and the value of the angular velocity relative to the ground of the robot chassis is equal to that of the angular velocity relative to the rotating chassis of the robot rotation mechanism.

Optionally, controlling, by the rotation controller, the rotation motor to synchronously rotate with the chassis motor by forming an interrupt according to the synchronous rotation instruction.

Optionally, the interrupt is formed, by the rotation controller, by responding to a level signal transition of an IO signal being the synchronous rotation instruction.

Optionally, sending, by the chassis controller, the information synchronization instruction to the rotation controller by a CAN bus in the case that the robot meets the rotation conditions; and performing, by the rotation controller, data initialization according to the information synchronization instruction, wherein the information synchronization instruction comprises information on.

Optionally, the method further comprises: determining, by the chassis controller, the angular velocity relative to the ground for the rotation of the robot chassis at predetermined period; and based on the synchronous rotation instruction sent by the chassis controller, determining, by the rotation controller, the angular velocity relative to the rotating chassis of the robot rotation mechanism during the interrupt.

Other features and advantages of the present invention will become apparent from the following detailed description of exemplary embodiments of the present disclosure with reference to the accompanying drawings.

DESCRIPTION OF THE DRAWINGS

The accompanying drawings, which are incorporated in and constitute a part of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION OF PREFERRED EMBODIMENTS

Figure 1:
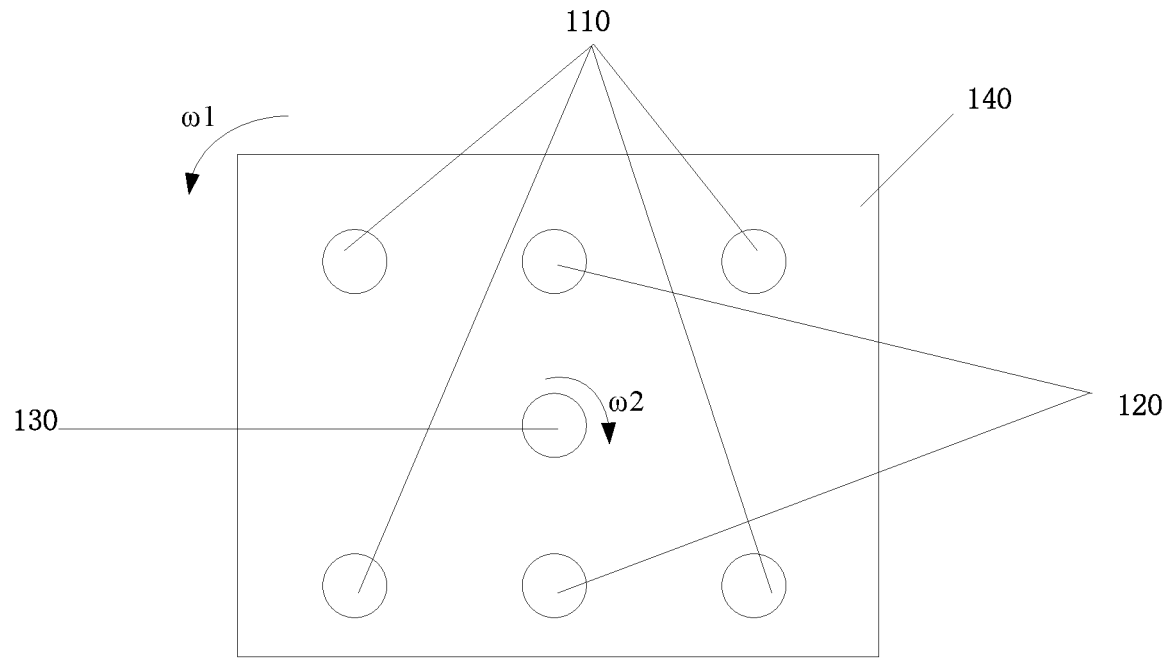
FIG. 1 is a schematic structural view of a robot body of the present disclosure.

Various exemplary embodiments of the present disclosure will now be described in detail with reference to the accompanying drawings. Notice that, unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the accompanying drawings.

For a clear understanding of the object of the present disclosure, its technical solution and advantages, the present disclosure will be further described in detail below in conjunction with the accompanying drawings and embodiments.

The inventors have recognized the need to overcome a number of technical difficulties in the warehouse applications of warehouse-transport robots. For example, with the rotation of the robot chassis, the shelf sometimes sways with rotation, which may cause the goods to fall off and cause some loss.

Figure 2:
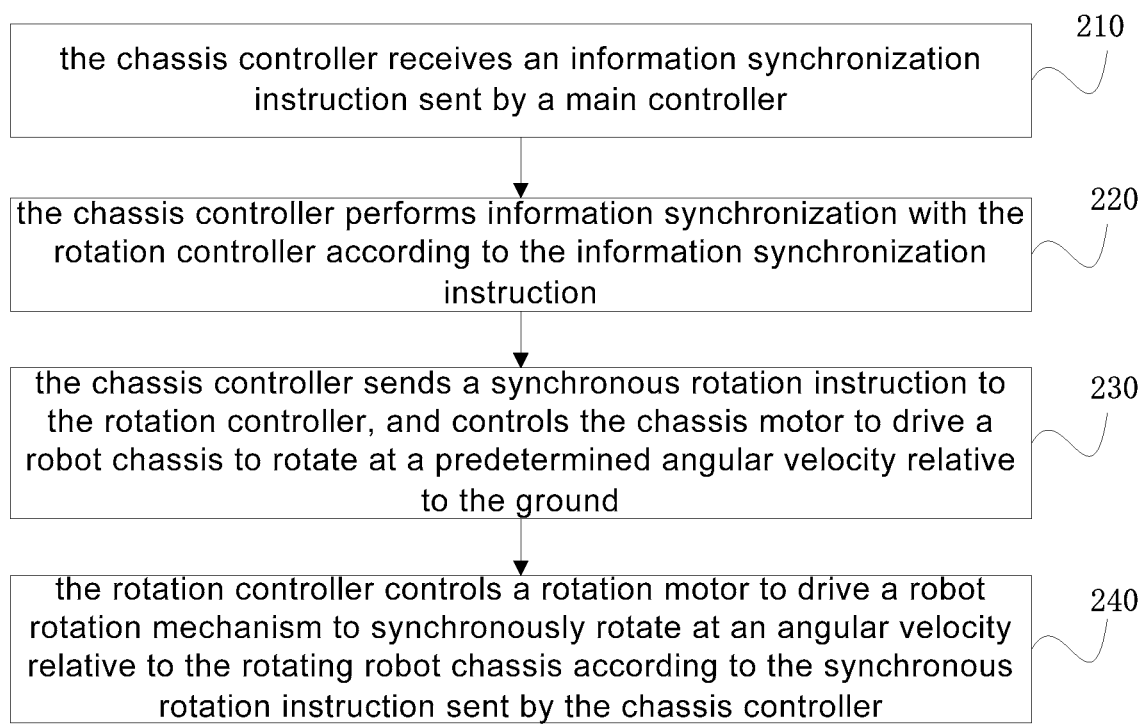
FIG. 2 is a schematic flow chart of a robot controlling method according to some embodiments of the present disclosure.

The robot body shown in FIG. 1 may comprise, for example, four driven wheels 110, two driving wheels 120, and a rotation mechanism 130. In order to bear the weight, the driven wheels 110 are universal wheels; the two driving wheels 120 drive a robot chassis 140 to move, and are connected to two servo motor systems; the rotation mechanism 130 is connected to a servo motor system, and the body is further provided with a lifting mechanism that is not shown in the figure. In view of the volume or mounting of controllers, two-axis motion controllers can be used to control four motors of the robot, that is, a chassis controller is used to control two motors of the driving wheels 120, to drive the chassis 140 to move, and rotation controller is used to control the rotation of a rotation motor and a lifting motor to drive the rotation mechanism 130 to rotate. FIG. 2 is a schematic flow chart of a robot controlling method according to some embodiments of the present disclosure. The robot controlling method comprises the following steps.

At step 210, the chassis controller receives an information synchronization instruction sent by a main controller.

At step 220, the chassis controller performs information synchronization with the rotation controller according to the information synchronization instruction. For example, after the chassis controller has received the information synchronization instruction sent by the main controller, the chassis controller sends the information synchronization instruction to the rotation controller in the case that the robot meets the rotation conditions, wherein the information synchronization instruction comprises information on a maximum angular velocity, an angular acceleration, and an angle of rotation, etc. The rotation controller performs an initialization process of corresponding synchronization data, and sends an acknowledgment response message to the chassis controller after the initialization process.

At step 230, the chassis controller sends a synchronous rotation instruction to the rotation controller, and controls the chassis motor to drive a robot chassis to rotate at a predetermined angular velocity relative to the ground. For example, the chassis controller controls the chassis motor to rotate. The chassis motor drives the driving wheels and in turn drive the robot chassis to rotate at a predetermined angular velocity relative to the ground.

At step 240, the rotation controller controls a rotation motor to drive a robot rotation mechanism to synchronously rotate at an angular velocity relative to the rotating robot chassis according to the synchronous rotation instruction sent by the chassis controller. Wherein, after receiving the synchronous rotation instruction sent by the chassis controller, the rotation controller can control the rotation motor to synchronously rotate with the chassis motor by forming an interrupt. The interruption delay of the rotation controller is very short, so that synchronization between the chassis controller and the rotation controller can be achieved, and the two controllers can synchronously control the chassis motor and the rotation motor.

In order to keep the shelf stationary when the chassis is rotating, the direction of the angular velocity relative to the ground of the robot chassis should be opposite to that of the angular velocity relative to the rotating chassis of the robot rotation mechanism and the value of the angular velocity relative to the ground of the robot chassis should be equal to that of the angular velocity relative to the rotating chassis of the robot rotation mechanism. For example, if the angular velocity relative to the ground of the robot chassis is 20 rad/s, the angular velocity of the rotation mechanism of the robot relative to the rotating robot chassis is also 20 rad/s, but the rotation direction of the rotation direction of the rotation mechanism is opposite to that of the chassis.

In this embodiment, after the information synchronization between the chassis controller and the rotation controller, the robot chassis motor and the rotation motor are controlled to synchronously movement, thereby the robot chassis and the rotation mechanism are driven to rotate synchronously in opposite directions, thereby precise control of the rotation of the warehouse-transport robot is realized to reduce shelf swaying while the robot chassis is rotating.

Figure 3:
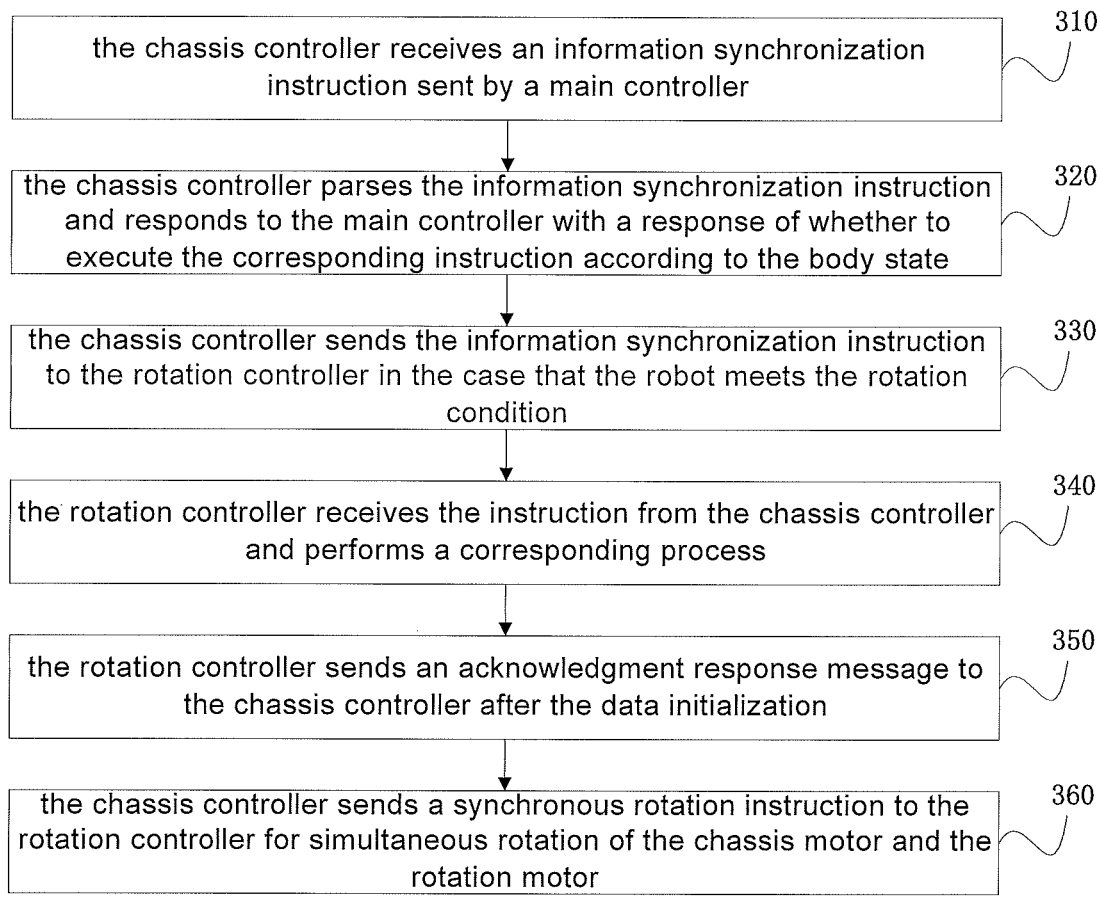
FIG. 3 is a schematic flow chart of a robot controlling method according to some other embodiments of the present disclosure.

FIG. 3 is a schematic flow chart of a robot controlling method according to some other embodiments of the present disclosure. The method comprises the following steps.

At step 310, the chassis controller receives an information synchronization instruction sent by a main controller.

At step 320, the chassis controller parses the information synchronization instruction and responds to the main controller with a response of whether to execute the corresponding instruction according to the body state. For example, the chassis controller determines whether the current IO interface is normal, whether a rotation condition is met, and the like.

At step 330, the chassis controller sends the information synchronization instruction to the rotation controller in the case that the robot meets the rotation condition. Wherein, the main controller, the chassis controller and the rotation controller are connected by a CAN bus. The information synchronization instruction sent by the chassis controller to the rotation controller comprises information on a maximum angular velocity, an angular acceleration, and an angle of rotation.

At step 340, the rotation controller receives the instruction from the chassis controller and performs a corresponding process, i.e., an initialization process of corresponding synchronization data.

At step 350, the rotation controller sends an acknowledgment response message to the chassis controller after the data initialization.

At step 360, the chassis controller sends a synchronous rotation instruction to the rotation controller for simultaneous rotation of the chassis motor and the rotation motor.

Figure 4:
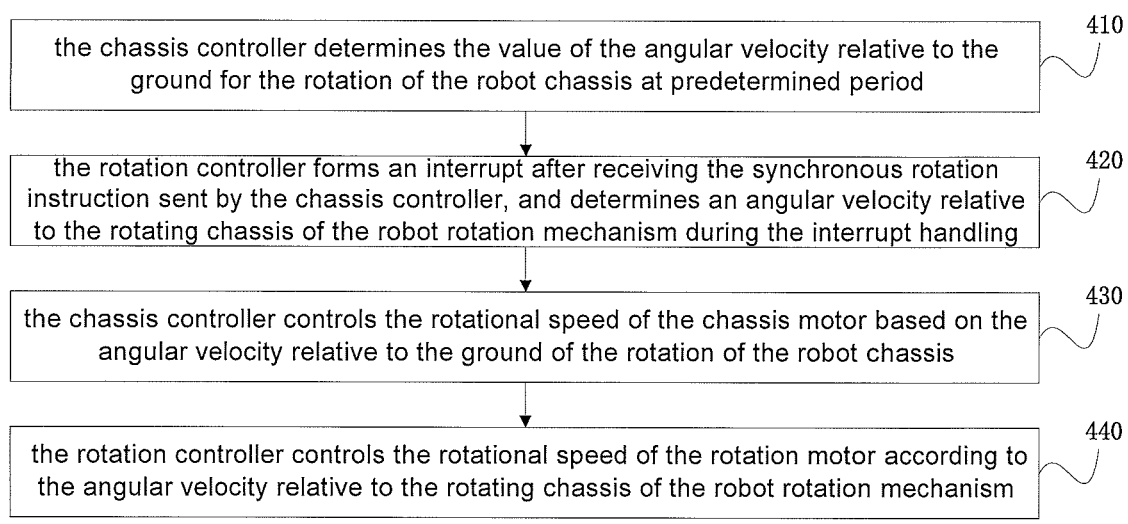
FIG. 4 is a schematic flow chart of a robot controlling method according to further embodiments of the present disclosure.

In order to keep the shelf stationary during the rotation of the chassis, it is required that the value of the angular velocity of the rotation mechanism and the value of the rotational angular velocity of the chassis are equal at each moment, that is, the direction of the angular velocity relative to the ground of the robot chassis should be opposite to that of the angular velocity relative to the rotating chassis of the robot rotation mechanism and the value of the angular velocity relative to the ground of the robot chassis should be equal to that of the angular velocity relative to the rotating chassis of the robot rotation mechanism. To achieve the above effect, the following three conditions must be met: condition 1: simultaneous starting of the rotation motor and the chassis motor, and simultaneous speed control thereof; condition 2: the same settings of the maximum angular velocity, the angular acceleration, and the rotation angle; condition 3: the same speed planning algorithm for the chassis controller and the rotation controller. Condition 2 above can be met by CAN communication synchronization. Condition 3 can be met by unified settings in software. Condition 1 can be realized by the method shown in FIG. 4. The method shown in FIG. 4 comprises the following steps.

Figure 5:
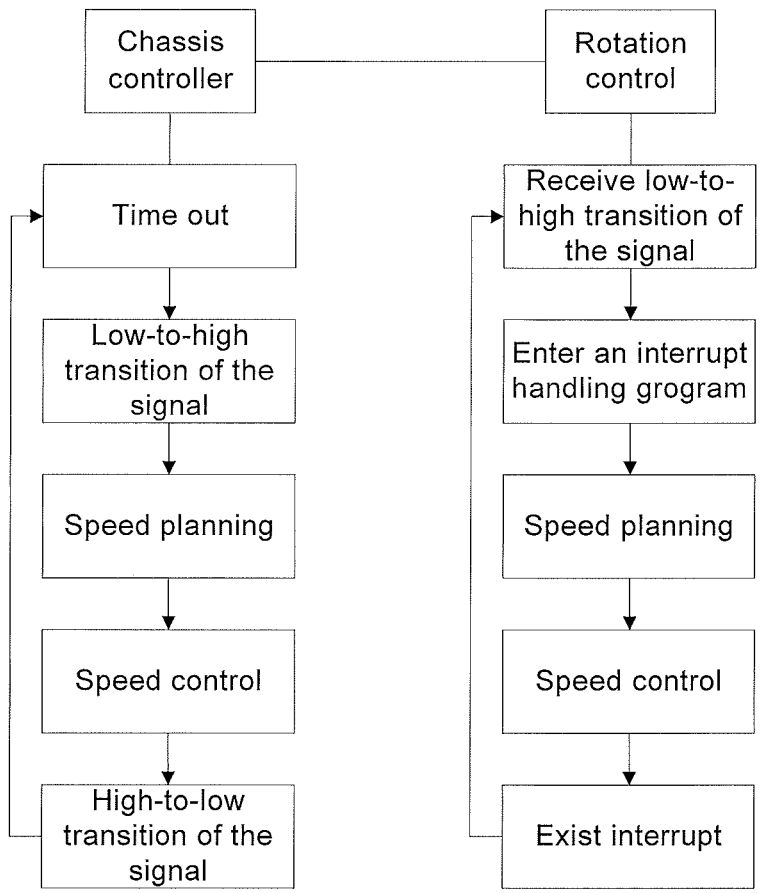
FIG. 5 is a schematic diagram of a synchronization process of a chassis controller and a rotation controller according to the present disclosure.

At step 410, the chassis controller determines the value of the angular velocity relative to the ground for the rotation of the robot chassis at predetermined period. That is, the chassis controller performs speed planning and speed control at certain intervals, and this interval can be controlled by a timer. As shown in FIG. 5, a general IO signal is used to connect the chassis controller to the rotation controller. Before the speed planning, the IO signal of the chassis controller changes from a low level to a high level. After the speed control, the IO signal changes from a high level to a low level.

At step 420, the rotation controller forms an interrupt after receiving the synchronous rotation instruction sent by the chassis controller, and determines an angular velocity relative to the rotating chassis of the robot rotation mechanism during the interrupt handling. As shown in FIG. 5, the rotation controller forms an interrupt according to the transition from a low level to a high level in the received IO signal, and performs corresponding speed planning and speed control in the handling of the interrupt.

At step 430, the chassis controller controls the rotational speed of the chassis motor based on the angular velocity relative to the ground of the rotation of the robot chassis.

At step 440, the rotation controller controls the rotational speed of the rotation motor according to the angular velocity relative to the rotating chassis of the robot rotation mechanism.

Wherein, steps 430 and 440 are performed simultaneously. As for the signal transmission delay, since the interruption delay of the rotation controller is very short, synchronization between the chassis controller and the rotation controller can be achieved, and the two controllers can synchronously control the chassis motor and the rotation motor.

In the above embodiment, information synchronization between the chassis controller and the rotation controller is realized by CAN communication, and the rotation synchronization of the chassis controller and the rotation controller is realized by a hardware interrupt, therefore, the precise control of the rotation of the warehouse-transport robot is improved, and the rotation efficiency is improved. The shelf is kept stationary to the ground while the robot is rotating, therefore, the possibility of cargo falling is reduced.

Figure 6:
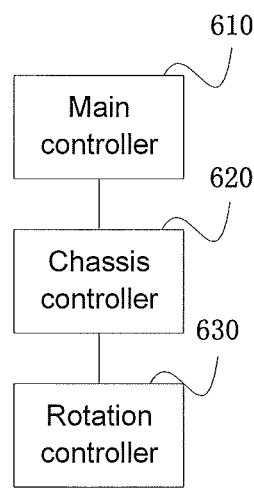
FIG. 6 is a schematic structural view of a robot controlling system according to some embodiments of the present disclosure.

FIG. 6 is a schematic structural view of a robot controlling system according to some embodiments of the present disclosure. The robot controlling system comprises a main controller 610, a chassis controller 620, and a rotation controller 630, wherein:

a main controller 610 is used for sending an information synchronization instruction to the chassis controller 620.

Figure 7:
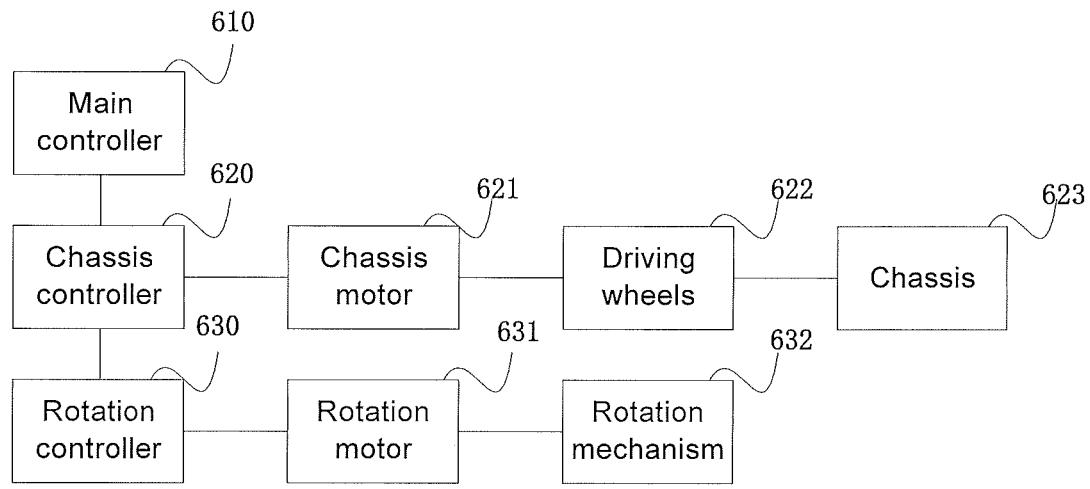
FIG. 7 is a structure diagram of an application of the robot controlling system of the present disclosure.

The chassis controller 620 is used for performing information synchronization with the rotation controller 630 according to information synchronization instruction, and also for sending a synchronous rotation instruction to the rotation controller 630, controlling a chassis motor to drive a robot chassis to rotate at a predetermined angular velocity. As shown in FIG. 7, the chassis controller 620 is electrically connected to the chassis motor 621, and the chassis motor 621 drives the driving wheels 622 to rotate, thereby driving the chassis 623 to rotate. Wherein, after the chassis controller 620 has received an information synchronization instruction sent by the main controller 610, it sends the information synchronization instruction to the rotation controller 630 in the case that the robot meets the rotation conditions, wherein the information synchronization instruction comprises information on a maximum angular velocity, an angular acceleration, and an angle of rotation, etc. The rotation controller 630 performs an initialization process of corresponding synchronization data, and sends an acknowledgment response message to the chassis controller 620 after the initialization process.

The rotation controller 630 is used for controlling a rotation motor to drive a robot rotation mechanism to synchronously rotate at an angular velocity relative to the rotating robot chassis according to the synchronous rotation instruction sent by the chassis controller 620. As shown in FIG. 7, the rotation controller 630 is electrically connected to the rotation motor 631, and the rotation motor 631 drives the rotation mechanism 632 to rotate. Wherein, after receiving the synchronous rotation instruction sent by the chassis controller 620, the rotation controller 630 can control the rotation motor to synchronously rotate with the chassis motor by forming an interrupt. The interruption delay of the rotation controller 630 is very short, so that synchronization between the chassis controller 620 and the rotation controller 630 can be achieved, and the two controllers can synchronously control the chassis motor 621 and the rotation motor 631.

In order to keep the shelf stationary to the ground when the chassis is rotating, the direction of the angular velocity relative to the ground of the robot chassis 623 should be opposite to that of the angular velocity relative to the rotating chassis of the robot rotation mechanism 632, and the value of the angular velocity relative to the ground of the robot chassis 623 should be equal to that of the angular velocity relative to the rotating chassis of the robot rotation mechanism 632. For example, if the angular velocity relative to the ground of the robot chassis 623 is 20 rad/s, the angular velocity of the rotation mechanism 632 of the robot relative to the rotating robot chassis 623 is also 20 rad/s, but the rotation direction of the rotation mechanism 632 is opposite to the rotation direction of the chassis 623.

In this embodiment, after the information synchronization between the chassis controller and the rotation controller, the robot chassis motor and the rotation motor are controlled to synchronously movement, thereby the robot chassis and the rotation mechanism are driven to rotate synchronously in opposite directions, thereby precise control of the rotation of the warehouse-transport robot is realized to reduce shelf swaying while the robot chassis is rotating.

In another embodiment of the present disclosure, the main controller 610 is used for sending an information synchronization instruction to the chassis controller 620. The chassis controller 620 is used for parsing the information synchronization instruction, and responding to the main controller 610 with a response of whether the corresponding instruction will be executed, and sending the information synchronization instruction to the rotation controller 630 in the case that the robot meets the rotation condition. Wherein, the main controller 610, the chassis controller 620 and the rotation controller 630 are connected by a CAN bus. The rotation controller 630 receives the instruction from the chassis controller 620, and performs an initialization process of corresponding synchronization data. After the data synchronization, the rotation controller 630 sends an acknowledgment response message to the chassis controller 620.

The chassis controller 620 is further used for determining the value of the angular velocity relative to the ground of the rotation of the robot chassis at predetermined period, and controlling the rotation speed of the chassis motor according to the angular velocity relative to the ground of the rotation of the robot chassis. That is, the chassis controller performs speed planning and speed control at certain intervals. This interval can be controlled by a timer. As shown in FIG. 5, a general IO signal is used to connect the chassis controller to the rotation controller. Before the speed planning, the IO signal of the chassis controller changes from a low level to a high level, and changes from a high level to a low level after the speed control.

The rotation controller 630 is further used for forming an interrupt after receiving the synchronous rotation instruction sent by the chassis controller, determining an angular velocity relative to the rotating chassis of the robot rotation mechanism in the handling of the interrupt, and controlling the rotation speed of the rotation motor according to the angular velocity relative to the rotating chassis of the robot rotation mechanism. As shown in FIG. 5, the rotation controller forms an interrupt according to the transition from a low level to a high level in the received IO signal, and performs corresponding speed planning and speed control in the handling of the interrupt.

In the above embodiment, information synchronization between the chassis controller and the rotation controller is realized by CAN communication, and the rotation synchronization of the chassis controller and the rotation controller is realized by a hardware interrupt. As for the signal transmission delay, since the interruption delay of the rotation controller is very short, synchronization between the chassis controller and the rotation controller can be achieved, and the two controllers can synchronously control the chassis motor and the rotation motor, therefore, the precise control of the rotation of the warehouse-transport robot is improved, and the rotation efficiency is improved. The shelf is kept stationary to the ground while the robot is rotating, therefore, the possibility of cargo falling is reduced.

Figure 8:
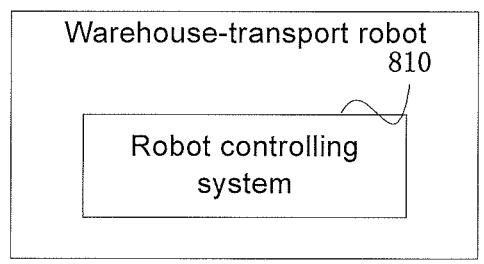
FIG. 8 is a schematic structural view of a warehouse-transport robot according to some embodiments of the present disclosure.

FIG. 8 is a schematic structural view of a warehouse-transport robot according to some embodiments of the present disclosure. The warehouse-transport robot comprises the robot controlling system 810 described above, wherein the robot controlling system 810 has been described in detail in the above embodiments and will not be further described herein.

The warehouse-transport robot in this embodiment can keep the shelf stationary while the chassis is rotating, therefore, the possibility of cargo falling from the shelf is reduced.

Figure 9:
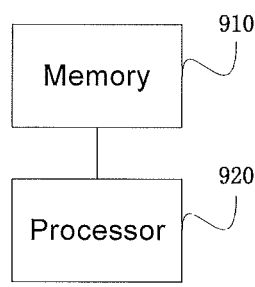
FIG. 9 is a schematic structural view of a robot controlling system according to other embodiments of the present disclosure.

FIG. 9 is a schematic structural view of a robot controlling system according to other embodiments of the present disclosure. The robot controlling system comprises one or more memories 910 and processors 920, processors 920 are, for example, a master controller, a chassis controller, and a rotation controller, wherein:

Each memory 910 may be a magnetic disk, flash memory or any other non-volatile storage medium. The memory is used to store instructions of corresponding embodiments shown in FIGS. 2-5.

Each processor 920 is coupled to corresponding memory 910 and may be implemented as one or more integrated circuits, such as a microprocessor or microcontroller. The processors 920 are used to execute the instructions stored in the memory and can improve precise control of the rotation of the warehouse-transport robot.

Figure 10:
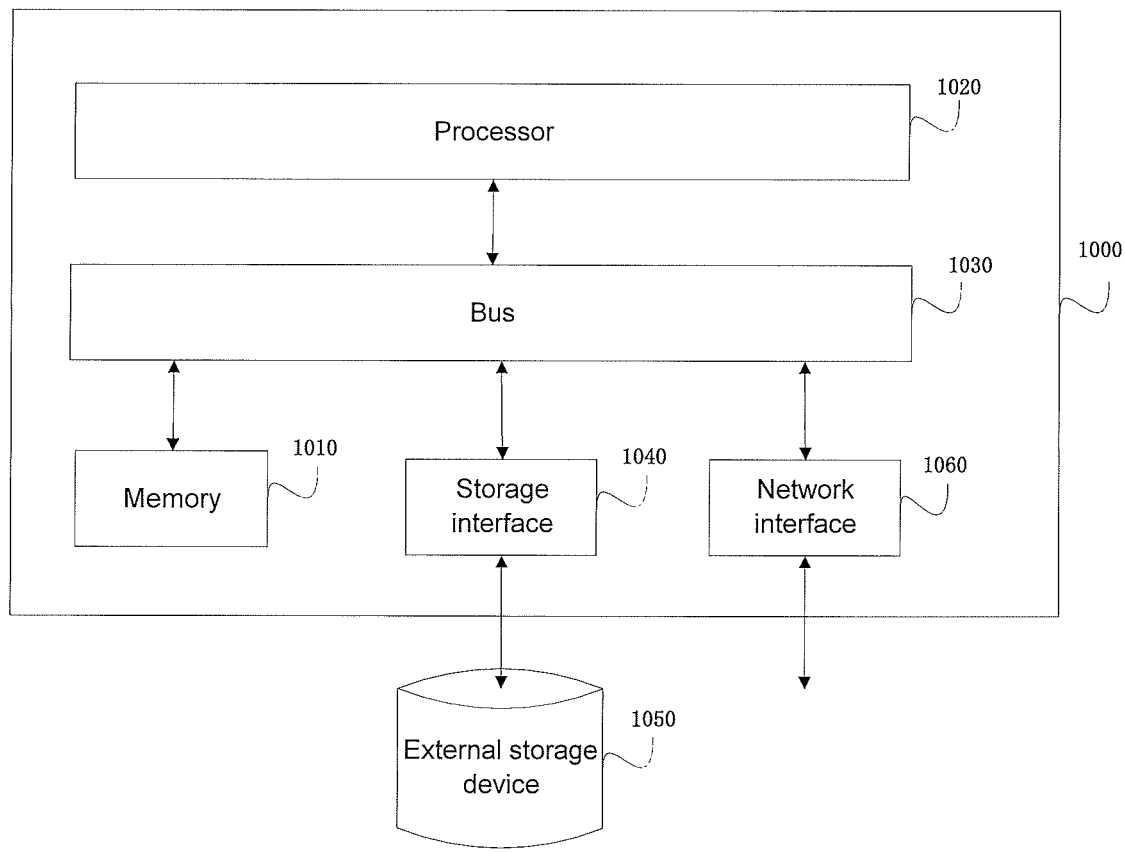
FIG. 10 is a schematic structural view of a robot controlling system according to further embodiments of the present disclosure.

In one embodiment, as shown in FIG. 10, the robot controlling system 1000 comprises one or more memories 1010 and processors 1020. Each processor 1020 is coupled to corresponding memory 1010 via a bus 1030. The robot controlling system 1000 may be further connected to an external storage device 1050 through a storage interface 1040 to access external data, and may be further connected to a network or another computer system (not shown) through a network interface 1060, the details of which will not described herein.

In this embodiment, through storing data instructions in the memory and processing the above instructions by the processor, precise control of the rotation of the warehouse-transport robot can be improved, the rotation efficiency is improved, and the shelf is kept stationary while the robot rotates, therefore, the possibility of cargo falling is reduced.

In another embodiment, there is provided a computer-readable storage medium having computer program instructions stored thereon that, when executed by a processor, implement the steps of the methods of corresponding embodiments shown in FIGS. 2-5. One skilled in the art should understand that, the embodiments of the present disclosure may be provided as a method, an apparatus, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Heretofore, the present disclosure has been described in detail. In order to avoid obscuring the concepts of the present disclosure, some details known in the art are not described. Based on the above description, those skilled in the art can understand how to implement the technical solutions disclosed herein.

The method and apparatus of the present disclosure may be implemented in many ways. For example, the method and apparatus of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which include machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A robot controlling method, comprising:
receiving, by a chassis controller, an information synchronization instruction sent by a main controller;
performing, by the chassis controller, information synchronization with a rotation controller according to the information synchronization instruction;
sending, by the chassis controller, a synchronous rotation instruction to the rotation controller, and controlling a chassis motor to drive a robot chassis to rotate at a predetermined angular velocity relative to a ground;
performing, by the rotation controller, data initialization according to the information synchronization instruction, wherein the information synchronization instruction comprises information on a maximum angular velocity, an angular acceleration, and an angle of rotation; and
controlling, by the rotation controller, a rotation motor to drive a robot rotation mechanism to synchronously rotate at an angular velocity relative to the rotating robot chassis according to the synchronous rotation instruction, wherein
a direction of the angular velocity relative to the ground of the robot chassis is opposite to that of the angular velocity relative to the rotating chassis of the robot rotation mechanism, and
a value of the angular velocity relative to the ground of the robot chassis is equal to that of the angular velocity relative to the rotating chassis of the robot rotation mechanism.

2. The method according to claim 1, further comprising:
controlling, by the rotation controller, the rotation motor to synchronously rotate with the chassis motor by forming an interrupt according to the synchronous rotation instruction.

3. The method according to claim 2, wherein the interrupt is formed, by the rotation controller, by responding to a level signal transition of an Input/Output (IO) signal being the synchronous rotation instruction.

4. The method according to claim 2, further comprising:
determining, by the chassis controller, the angular velocity relative to the ground for the rotation of the robot chassis at predetermined period; and
based on the synchronous rotation instruction sent by the chassis controller, determining, by the rotation controller, the angular velocity relative to the rotating chassis of the robot rotation mechanism during the interrupt.

5. The method according to claim 1, further comprising:
sending, by the chassis controller, the information synchronization instruction to the rotation controller by a Controller Area Network (CAN) bus in a case that the robot meets rotation conditions.

6. A robot controlling system, comprising:
one or more memories, a main controller, a chassis controller, and a rotation controller,
wherein, the main controller, the chassis controller, and the rotation controller are configured to execute a method on a basis of instructions stored in the memories, comprising:
receiving, by the chassis controller, an information synchronization instruction sent by the main controller;
performing, by the chassis controller, information synchronization with the rotation controller according to the information synchronization instruction;
sending, by the chassis controller, a synchronous rotation instruction to the rotation controller via a Controller Area Network (CAN) bus in a case that the robot meets rotation conditions, and controlling a chassis motor to drive a robot chassis to rotate at a predetermined angular velocity relative to a ground;
performing, by the rotation controller, data initialization according to the information synchronization instruction, wherein the information synchronization instruction comprises information on a maximum angular velocity, an angular acceleration, and an angle of rotation; and
controlling, by the rotation controller, a rotation motor to drive a robot rotation mechanism to synchronously rotate at an angular velocity relative to the rotating robot chassis according to the synchronous rotation instruction, wherein
a direction of the angular velocity relative to the ground of the robot chassis is opposite to that of the angular velocity relative to the rotating chassis of the robot rotation mechanism, and
a value of the angular velocity relative to the ground of the robot chassis is equal to that of the angular velocity relative to the rotating chassis of the robot rotation mechanism.

7. The robot controlling system according to claim 6, wherein the method further comprises:
controlling, by the rotation controller, the rotation motor to synchronously rotate with the chassis motor by forming an interrupt according to the synchronous rotation instruction.

8. The robot controlling system according to claim 7, wherein the interrupt is formed by responding to a level signal transition of an Input/Output (IO) signal being the synchronous rotation instruction.

9. A warehouse-transport robot, comprising the robot controlling system of claim 8.

10. The robot controlling system according to claim 7, wherein the method further comprises:
determining, by the chassis controller, the angular velocity relative to the ground for the rotation of the robot chassis at predetermined period; and
based on the synchronous rotation instruction sent by the chassis controller, determining, by the rotation controller, the angular velocity relative to the rotating chassis of the robot rotation mechanism during the interrupt.

11. A warehouse-transport robot, comprising the robot controlling system of claim 10.

12. A warehouse-transport robot, comprising the robot controlling system of claim 7.

13. A warehouse-transport robot, comprising the robot controlling system of claim 6.

14. A non-transitory computer-readable storage medium on which computer program instructions are stored, which when executed by a processor implement a method, comprising:
receiving, by a chassis controller, an information synchronization instruction sent by a main controller;
performing, by the chassis controller, information synchronization with a rotation controller according to the information synchronization instruction;
sending, by the chassis controller, a synchronous rotation instruction to the rotation controller via a Controller Area Network (CAN) bus in a case that a robot meets rotation conditions, and controlling a chassis motor to drive a robot chassis to rotate at a predetermined angular velocity relative to a ground;
performing, by the rotation controller, data initialization according to the information synchronization instruction, wherein the information synchronization instruction comprises information on a maximum angular velocity, an angular acceleration, and an angle of rotation; and controlling, by the rotation controller, a rotation motor to drive a robot rotation mechanism to synchronously rotate at an angular velocity relative to the rotating robot chassis according to the synchronous rotation instruction, wherein a direction of the angular velocity relative to the ground of the robot chassis is opposite to that of the angular velocity relative to the rotating chassis of the robot rotation mechanism, and a value of the angular velocity relative to the ground of the robot chassis is equal to that of the angular velocity relative to the rotating chassis of the robot rotation mechanism.

15. The non-transitory computer-readable storage medium according to claim 14, wherein the method further comprises:

controlling, by the rotation controller, the rotation motor to synchronously rotate with the chassis motor by forming an interrupt according to the synchronous rotation instruction.

16. The non-transitory computer-readable storage medium according to claim 15, wherein the interrupt is formed, by the rotation controller, by responding to a level signal transition of an Input/Output (IO) signal being the synchronous rotation instruction.

17. The non-transitory computer-readable storage medium according to claim 15, wherein the method further comprises:

determining, by the chassis controller, the angular velocity relative to the ground for the rotation of the robot chassis at predetermined period; and based on the synchronous rotation instruction sent by the chassis controller, determining, by the rotation controller, the angular velocity relative to the rotating chassis of the robot rotation mechanism during the interrupt.

* * * * *